US000001982H

(19) United States

(12) Statutory Invention Registration (10) Reg. No.: US H1982 H

Dunn et al. (43) Published: Aug. 7, 2001

(54) PRIMER COATED AMORPHOUS PLASTIC FILMS

(75) Inventors: Alan Robert Dunn; Michael Lynn Cassell, both of Kingsport, TN (US)

(73) Assignee: Eastman Chemical Company, Kingsport, TN (US)

(21) Appl. No.: 09/228,438

(22) Filed: Jan. 11, 1999

Related U.S. Application Data

(62) Division of application No. 08/878,953, filed on Jun. 19, 1997, now abandoned.

(60) Provisional application No. 60/020,116, filed on Jun. 20, 1996.

(51) Int. Cl.[7] ..... B05D 1/36

(52) U.S. Cl. ..... 427/258; 427/412.5; 427/416

(58) Field of Search ..... 427/258, 412.5, 427/416

(56) References Cited

U.S. PATENT DOCUMENTS

| | | | | |
|---|---|---|---|---|
| 4,824,725 | | 4/1989 | Thoese . | |
| 5,075,364 | | 12/1991 | Phan et al. . | |
| 5,218,032 | * | 6/1993 | Sharma | 524/379 |
| 5,496,647 | | 3/1996 | Krejci et al. . | |
| 5,643,666 | * | 7/1997 | Eckart et al. | 428/339 |

* cited by examiner

*Primary Examiner*—Charles T. Jordan
*Assistant Examiner*—Aileen J. Baker
(74) *Attorney, Agent, or Firm*—Cheryl J. Tubach; Harry J. Gwinnell

(57) ABSTRACT

Water-dissipative copolyesters are primer coatings for substantially amorphous polymeric films providing improved ink adhesion and improved slip characteristics. The primer coatings comprise copolyester having repeat units from a dicarboxylic acid component comprising 8 to 25 mole percent 5-sulfoisophthalic acid and 75 to 92 mole percent isophthalic acid and repeat units from a diol component comprising 25 to 100 mole percent diethylene glycol, 0 to 75 mole percent 1,4-cyclohexane-dimethanol, and 0 to 30 mole percent ethylene glycol, based on 100 mole percent dicarboxylic acid component and 100 mole percent diol component. The polymeric films are preferably polyester, polycarbonate or poly(vinyl chloride). These copolyesters primer coatings are generally dispersed in water or water/alcohol mixtures to a solids content of 20 to 35 weight percent.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRIMER COATED AMORPHOUS PLASTIC FILMS

This application is a division of Ser. No. 08/878,953 filed Jun. 19, 1997, now abandoned and also claims the benefit of U.S. Provisional Application No. 60/020,116 filed Jun. 20, 1996.

TECHNICAL FIELD

This invention relates to plastic films used in graphic arts and, ore particularly, to such films that are amorphous and have been coated with a primer to improve adhesion of inks applied thereto and to improve slip characteristics when in contact with other films.

BACKGROUND OF THE INVENTION

In the graphic arts industry, clear plastic films or sheets made of various polymers such as polyesters, polycarbonates or polyvinyl chloride are often used as the substrate support for signs and the like. The films are typically printed on with various designs that may be utilized to provide advertising or other information. The preferred printing materials are ultraviolet curable inks or water-based inks since they are typically solvent free. Of course, solvent-based inks are still utilized. Printing techniques vary depending on the particular application and printing operation.

Adhesion problems exist with certain inks, particularly the ultraviolet curable inks, when printed on substantially amorphous polymeric substrates. Adhesion of the ink refers to the bond between the ink and the substrate. Ideally, the adhesion is such that there would be 100 percent retention of the ink to the substrate.

Blocking, a common problem in the film industry, relates to properties of the ink. Blocking occurs when a printed film that has been rolled for shipping is exposed to heat and pressure. The exposure softens the resin in the printing ink allowing the ink to adhere to the backside of the adjacent film. When the blocked films are separated, damage to either the ink film, substrate or both can occur. To solve blocking, U.S. Pat. Nos. 5,006,598 and 5,041,489 disclose ink compositions comprising linear, water dispersible copolyesters containing sulfoisophthalic acid moieties. Blocking and adhesion differ since the former deals with the cohesive properties of the ink only and the latter deals with the bonding properties between the ink and a polymeric substrate.

Another problem with substantially amorphous substrates, in particular poly(ethylene terephthalate) copolyester containing 1,4-cyclohexanedimethanol, is that the substrates when contacted with other substrates stick together, i.e. the substrates have poor slip characteristics. Often a piece of tissue-like paper is used to keep the surfaces separate.

Thus, there exists a need in the art for a primer to the surface of polymeric films to provide improved adhesion of printing inks to the polymeric films and improved slip characteristics as measured by a decrease in the static or kinetic coefficient of friction. Accordingly, it is to the provision of such that the present invention is primarily directed.

SUMMARY OF THE INVENTION

A printable plastic film comprises a substantially amorphous polymeric film substrate and at least one surface having a primer coating thereon. The primer coating is a linear water-dissipative copolyester having repeat units from a dicarboxylic acid component comprising 8 to 25 mole percent of at least one sulfomonomer containing an alkali metal sulfonate group attached to a dicarboxylic aromatic nucleus and 75 to 92 mole percent isophthalic acid and repeat units from a diol component comprising 25 to 100 mole percent diethylene glycol, 0 to 75 mole percent 1,4-cyclohexanedimethanol, and 0 to 30 mole percent ethylene glycol, based on 100 mole percent dicarboxylic acid component and 100 mole percent diol component. The substantially amorphous substrate is preferably poly(ethylene terephthalate), poly(ethylene naphthalene dicarboxylate), polycarbonate, polyvinyl chloride, or a copolyester having repeat units from a dicarboxylic acid component comprising at least 75 mole percent terephthalic acid or naphthalene dicarboxylic acid and repeat units from a diol component comprising 0.5 to 65 mole percent 1,4-cyclohexanedimethanol and 35 to 99.5 mole percent ethylene glycol, based on 100 mole percent dicarboxylic acid component and 100 mole percent diol component. The film is prepared by melt extruding a polymeric material into the substantially amorphous polymeric film, then applying the primer coating to the film as an aqueous dispersion and drying the primer coating.

DESCRIPTION OF THE INVENTION

Certain linear, water-dissipative copolyesters are excellent primer coatings for polymeric films or sheets used in graphic arts. Such copolyesters have repeat units from a dicarboxylic acid component comprising about 8 to about 25 mole percent of at least one sulfomonomer containing an alkali metal sulfonate group attached to a dicarboxylic aromatic nucleus and about 75 to about 92 mole percent isophthalic acid and repeat units from a diol component comprising about 25 to 100 mole percent diethylene glycol, 0 to about 75 mole percent 1,4-cyclohexanedimethanol, and 0 to about 30 mole percent ethylene glycol. The dicarboxylic acid and diol components are each based on 100 mole percent. These copolyesters have inherent viscosity values of about 0.2 to about 0.8 dL/g, preferably about 0.4 to about 0.6 dL/g.

Preferably the copolyester primer coating comprises 9 to 15 mole percent of the sulfomonomer containing an alkali metal sulfonate group attached to a dicarboxylic aromatic nucleus, 85 to 91 mole percent isophthalic acid, and 31 to 80 mole percent diethylene glycol. The sulfomonomer is preferably a 5-sulfo-isophthalic acid and is typically in the form of a metallic sulfonate salt. The metal ion of the sulfonate salt group may be $Na^+$, $Li^+$, $K^+$, $Mg^{++}$, $Ca^{++}$, $Cu^{++}$, $Fe^{++}$, or $Fe^{+++}$. It is also possible that the sulfonate salt is non-metallic and can be a nitrogen-containing base as described in U.S. Pat. No. 4,304,901, incorporated herein by reference. The most preferred repeating unit is 5-sodiosulfoisophthalic acid.

The dicarboxylic acid component of the copolyester primer coating may be modified with up to about 10 mole percent, preferably 5 mole percent, of one or more different dicarboxylic acids other than isophthalic acid. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples to be included as the modifying acids include terephthalic acid, phthalic acid, naphthalene-2,6-dicarboxlic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above modifying acids. It should be understood that use of the corresponding acid anhydrides, esters, and acid chlorides of these acids is included in the term "dicarboxylic acid".

In addition, the copolyester primer coating may optionally be modified with up to 10 mole percent, preferably up to 5 mole percent, of one or more other diols. Such additional diols include cycloaliphatic diols preferably having 6 to 20 carbon atoms or aliphatic diols preferably having 3 to 20 carbon atoms. Examples of modifying diols include triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4dihydroxy-1,1,3,3-tetramethyl-cyclobutane, 2,2-bis-(3-hydroxyethoxyphenyl)-propane, and 2,2-bis-(4-hydroxypropoxyphenyl)-propane.

The primer coating can optionally contain up to 10 weight percent of the total composition, preferably up to about 5 weight percent, of one or more additives. Such additives include waxes such as Jonwax 26, Jonwax 120 (available from S. C. Johnson and Sons, Inc. of Racine, Wis.) or Vanwax 35 (available from Vantage of Garfield, N.J.); surfactants such as Surfynol 104 or Surfynol 440 (available from Air Products and Chemicals of Allentown, Pa.), Carbowet 990(available from Vantage) or Aerosol OT-75 (available from American Cyanamid of Wayne, N.J.); defoamers such as Foamaster 111 (available from Henkel Corporation of Morristown, N.J.); alcohols containing 1 to 10 carbon atoms; glycols such as ethylene glycol or propylene glycol; alcohol ethers such as propylene glycol monobutyl ether, ethylene glycol monobutyl ether or propylene glycol monomethyl ether; biocides; pH stabilizers; thickeners such as Acrysol RM.825 (available from Rohm & Haas of Philadelphia, Pa.); and the like.

The polymeric film substrates are substantially amorphous films or sheets. "Substantially amorphous" as used herein means that the film substrates have a low level of crystallinity, i.e. that the films are slowly crystallizable. Their degree of crystallinity, a typical measure of the amorphous nature of a polymer, provides a ratio between the volume of the crystalline and the amorphous areas. For substantially amorphous polymers of the present invention the degree of crystallinity is less than 20 percent, preferably less than 15 percent, and more preferably less than 10 percent. Methods for determining the degree of crystallinity are well known in the art.

Preferred substrates are homopolymers of poly(ethylene terephthalate) and poly(ethylene naphthalene dicarboxylate), poly(ethylene terephthalate) copolyester containing 1,4-cyclohexanedimethanol (PETG copolyester), poly(ethylene naphthalene dicarboxylate) copolyester containing 1,4-cyclohexanedimethanol (PEN copolyester), polycarbonate, or poly(vinyl chloride).

The polymeric film substrates are preferably prepared by melt extrusion process well known in the art. In the melt extrusion process, the thermoplastic component is plasticated (melted and mixed) in an extruder and forced through an orifice in a die. The copolyesters are readily extruded in-line and then chopped into the desired shape and size. The substrates do not undergo any uniaxial or biaxial orientation (which creates highly crystalline structures) after being formed into sheets. Film thickness of the substrate varies depending on the application. When used in lithographic printing systems, the films will generally be in the range of about 5 to about 20-mil thickness. In flexographic systems, the filming will generally be in the 0.5 to 30-mil thickness range with 5 to 25 mil thickness preferred.

The PETG copolyesters are the preferred materials as the polymeric film substrate because they have excellent clarity and other desirable physical properties. PETG copolyesters useful as the substrate have repeat units from a dicarboxylic acid component comprising at least 75 mole percent, preferably 95 mole percent, terephthalic acid and repeat units from a diol component comprising 0.5 to 65 mole percent, preferably 10 to 40 mole percent, 1,4-cyclohexanedimethanol and 35 to 99.5 mole percent, preferably 60 to 90 mole percent, ethylene glycol. The dicarboxylic acid component is based on 100 mole percent and the diol component is based on 100 mole percent. Copolyesters containing substantially only ethylene glycol, 1,4-cyclohexanedimethanol and terephthalic acid are even more preferred. These copolyesters have an inherent viscosity of 0.4 to 1.5 dL/g, preferably 0.5 to 0.9 dL/g. These copolyesters are well known in the art and commercially available. Methods for their preparation are described, for example, in U.S. Pat. No. 2,465,319 and 3,047,539.

The poly(ethylene naphthalene dicarboxylate) copolyesters containing 1,4-cyclohexanedimethanol (PEN copolyesters) have repeat units from a dicarboxylic acid component comprising at least 75 mole percent, preferably 95 mole percent, naphthalene dicarboxylic acid and repeat units from a diol component comprising 0.5 to 65 mole percent, preferably 10 to 40 mole percent, 1,4-cyclohexanedimethanol and 35 to 99.5 mole percent, preferably 60 to 90 mole percent, ethylene glycol. The dicarboxylic acid component is based on 100 mole percent and the diol component is based on 100 mole percent. These PEN copolyesters and processes for making them are well known in the art.

The dicarboxylic acid component of the PETG copolyesters or the PEN copolyesters in the polymeric film substrate may be modified with up to about 25 mole percent, preferably 5 mole percent, of one or more different dicarboxylic acids other than terephthalic acid or naphthalene dicarboxylic acid. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples to be included as the modifying acids include terephthalic acid, phthalic acid, isophthalic acid, naphthalene-2,6-dicarboxlic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above dicarboxylic acids. It should be understood that use of the corresponding acid anhydrides, esters, and acid chlorides of these acids is included in the term "dicarboxylic acid".

In addition the copolyester of the polymeric film substrate may optionally be modified with up to 25 mole percent, preferably up to 10 mole percent, of one or more other diols. Such additional diols include cycloaliphatic diols preferably having 6 to 20 carbon atoms or aliphatic diols preferably having 3 to 20 carbon atoms. Examples of modifying diols include diethylene glycol, triethylene glycol, propane-1,3-diol, butane-1,4-diol, pentane-1,5-diol, hexane-1,6-diol, 3-methylpentanediol-(2,4), 2-methylpentanediol-( 1,4), 2,2,4-trimethylpentane-diol-( 1,3), 2-ethylhexanediol-( 1,3), 2,2-diethylpropane-diol- (1,3), hexanediol-( 1,3), 1,4-di-(hydroxyethoxy)-benzene, 2,2-bis-(4-hydroxycyclohexyl)-propane, 2,4-dihydroxy- 1,1,3,3-tetramethyl-cyclobutane, 2,2-bis-(3-hydroxy-ethoxyphenyl)-propane, and 2,2-bis-(4-hydroxypropoxyphenyl)-propane.

Polycarbonates useful as the substrate are generally chosen from bisphenol A polycarbonates or derivatives and/or copolymers thereof. Examples of the derivatives include 3,3',5,5'-tetramethyl bisphenol A polycarbonate and 3,3',5,5'-tetrabromo bisphenol A polycarbonate. The bisphenol A may be substituted with any aryl or alkyl groups which do not interfere with the production of the final polycarbonate and are generally tetra-substituted with the substituents being ortho to the phenolic -OH groups. Preferred polycarbonates are the parent bisphenol A polycarbonate and its copolymers with other bisphenols such as those described above.

The poly(vinyl chloride) (PVC) as a substrate may be either a homopolymer or a copolymer of rigid PVC. The homopolymer has repeating units of vinyl chloride monomer. The copolymer has repeating units of vinyl chloride monomer along with another monomer such as vinyl acetate, ethylene, propylene, or maleate. The modification in the copolymer is preferably 3 to 15 percent. The PVC may have additives incorporated such as stabilizers, processing aids, lubricants, colorants, ultraviolet absorbers, anti-block and slip agents. The rigid PVC is typically produced by suspension polymerization to produce resin with high bulk density. The rigid PVC is typically 90 percent resin with the remaining 10 percent the additives listed above. For extrusion grades, the K value, which is a measure of molecular weight is typically 60 to 75.

The primer coatings have been found to not be useful on polypropylene and crystalline polyesters. The primer coatings do not wet polypropylene films. Unmodified, crystalline poly(ethylene terephthalate) or poly(ethylene naphthalene dicarboxylate) are not desirable since these highly crystallizable polyesters tends to crystallize and provide a white or milky appearance during certain process operations.

The copolyester primer coating is applied with a thickness of about 0.1 to about 0.2 mils to the polymeric film substrate. To attain such thin primer coatings, the isophthalic acid based copolyesters are dispersed in water or water/alcohol mixtures prior to application to the substrate. The use of low molecular weight alcohols having 1 to about 4 carbon atoms is preferred. A particularly useful alcohol is n-propanol. The solids content of the dispersion is about 15 to about 40 weight percent, preferably about 20 to about 35 weight percent. Although the water dispersions are generally used in clear form, they may be colored if desired to add color to the substrate.

The primer dispersions are readily applied to extruded polymeric film substrates by a variety of methods including the use of a gravure kiss roll, knife roll, squeegee, spray, roll coater, and the like. When gravure rolls are used to apply the primer dispersion, they will generally have about 150 to 400 lines per inch. The primer coating may be dried at a web temperature of up to about 150° F. Oven temperatures of about 250 to about 300° F. are used to achieve this web temperature.

The coated polymeric substrates are readily printed with a variety of inks and printing systems. For example, ultraviolet curable as well as conventional offset inks may be used. In addition to offset printing, flexographic and gravure printing may be used. Ultraviolet curable inks typically comprise 15 to 20 percent pigment, 20 to 35 percent prepolymer, 10 to 25 percent monomer oligomers, 5 to 10 percent photoinitiators, and 1 to 5 percent "other" additives (all percentages being weight percents). The prepolymer and monomer oligomer portion may consist of resins with acrylate functionality such as epoxy acrylates, polyurethane acrylates, or polyester acrylates. Ultraviolet curable inks are available from Sun Chemical Corporation.

The printed coated substrates may be used in a variety of graphic arts applications such as point of purchase displays, place mats, menus, counter displays, and the like.

In addition the primer coating may be utilized in a laminate structure to provide enhanced adhesion. The laminate structure has the following ordered layers: the substantially amorphous polymeric film, the primer coating, a laminating adhesive, and a base layer such as paper, wood, or polymeric material. Typically the laminating adhesive is a pressure sensitive adhesive that has been applied on one surface of the base layer. The entire laminate structure is processed using typical laminating procedures of applying pressure and/or heat to secure bonding. Ink may be printed on the primer-coated surface.

Inherent viscosity is measured at 25° C. using 0.5 grams of polymer per 100 mL of a solvent consisting of 60 weight percent phenol and 40 weight percent tetrachloroethane.

The following examples will further illustrate this invention.

EXAMPLE 1

Several copolyester primer coating compositions, as detailed in Table 1 below, were applied onto PETG copolyester films with a drawdown bar to give a wet coating thickness of 0.00025" (6 microns). The PETG copolyester comprised repeat units of 100 mole percent terephthalic acid, 31 mole percent 1,4-cyclohexanedimethanol and 69 mole percent ethylene glycol. The alcohol content of the coating was 10 percent by weight to allow the coating to wet out the film. The coated film was then dried for 10 seconds in a forced air oven at 100° C. The adhesion of the coating was evaluated by applying a 2–3" piece of Scotch 610 tape to the coated side, and removing the tape at an approximate 450° angle. There was no removal of the coating.

TABLE 1

| | PRIMER COATING FORMULATION | | | | |
|---|---|---|---|---|---|
| | A | B | C | D | E |
| Isophthalic Acid, mol % | 90.43 | 90.65 | 90.29 | 91.00 | 89.00 |
| 5-Sodiosulfo-isophthalic acid, mol % | 9.57 | 9.35 | 9.71 | 9.00 | 11.00 |
| Diethylene glycol, mol % | 37.6 | 31.81 | 40.87 | 25.00 | 70.00 |
| 1,4-Cyclohexane dimethanol, mol % | 54.00 | 63.64 | 48.56 | 75.00 | 0 |
| Ethylene glycol, mol % | 8.40 | 4.55 | 10.57 | 0 | 30.00 |

EXAMPLE 2

The coated films of Example 1 were printed using an ultraviolet curable lithographic (offset) ink available from Sun Chemical Corporation. The ink was cured at 200 watts/inch, 50 feet/minute. The adhesion of the ink to the primer-coated film was evaluated by applying a 2–3" piece of Scotch 610 tape to the coated side, and removing the tape at an approximate 45° angle. There was 100 percent retention of inks to the film, i.e. 0 percent adhesion failure. Unprimed PETG copolyester printed with the ultraviolet curable offset ink, cured and evaluated as above, had a 100 percent loss of ink from the substrate, i.e. 0 percent adhesion.

EXAMPLE 3

Primer coating composition A from Table 1 was applied onto the following substantially amorphous polymeric films:

(1) a poly(ethylene naphthalene dicarboxylate) homopolymer;

(2) a polyester having repeat units from 100 mole percent terephthalic acid, 3.5 mole percent 1,4-cyclohexane dimethanol and 96.5 mole percent ethylene glycol, based on 100 mole percent acid and 100 mole percent diol components;

(3) LEXAN® 8010-112 polycarbonate, available from General Electric Company of Cincinnati, Ohio; and (4) poly(vinyl chloride). The ultraviolet curable offset ink composition of Example 2 was applied to each of the coated films. The adhesion of the ink to the primer-coated films was evaluated by applying a 2–3" piece of Scotch 610 tape to the coated side, and removing the tape at an approximate 45° angle. There was 100 percent retention of inks to the films, i.e. 0 percent adhesion failure.

EXAMPLE 4

Primer coating composition A from Table 1 was applied onto the PETG copolyester film as described in Example 1 and the polymeric films (1) to (4) as described in Example 3 to give wet thickness of 0.00015 and 0.00025 inches with a drawdown bar. The coefficient of friction (COF) of the coated film was evaluated on a TMI Flat Bed tester (ASTM D1894-73) coated side to uncoated side. Some primer coatings contained from 0 to 2.00 weight percent of a polyethylene wax emulsion. Results of Table 2 indicate that for PETG the primer coating itself reduced the COF, with subsequent reduction by the addition of the wax. For the other polymeric films the COF was reduced by the addition of wax.

TABLE 2

EFFECT OF PRIMER COATING ON THE COF

| Sub. Amorphous Substrate | Coating Thickness, Wet film (inches) | Wax, (wt %) | Static COF | Kinetic COF |
|---|---|---|---|---|
| No Coating | 0 | 0 | 0.656 | 0.503 |
| PETG (Ex. 1) | 0.00015 | 0 | 0.573 | 0.440 |
| PETG (Ex. 1) | 0.00025 | 0 | 0.518 | 0.419 |
| PETG (Ex. 1) | 0.00015 | 0.5 | 0.350 | 0.314 |
| PETG (Ex. 1) | 0.00015 | 1.0 | 0.358 | 0.285 |
| PETG (Ex. 1) | 0.00015 | 1.5 | 0.297 | 0.243 |
| PETG (Ex. 1) | 0.00015 | 2.0 | 0.293 | 0.247 |
| PETG (Ex. 1) | 0.00025 | 0.5 | 0.399 | 0.339 |
| PETG (Ex. 1) | 0.00025 | 1.0 | 0.332 | 0.292 |
| PETG (Ex. 1) | 0.00025 | 1.5 | 0.313 | 0.285 |
| PETG (Ex. 1) | 0.00025 | 2.0 | 0.294 | 0.253 |
| PETG (Ex. 3) | 0 | 0 | 0.390 | 0.339 |
| PETG (Ex. 3) | 0.00025 | 0 | 0.435 | 0.356 |
| PETG (Ex. 3) | 0.00025 | 1.0 | 0.185 | 0.157 |
| PETG (Ex. 3) | 0.00025 | 2.0 | 0.156 | 0.114 |
| Polycarbonate | 0 | 0 | 0.415 | 0.308 |
| Polycarbonate | 0.00025 | 0 | 0.439 | 0.351 |
| Polycarbonate | 0.00025 | 1.0 | 0.330 | 0.298 |
| Polycarbonate | 0.00025 | 2.0 | 0.137 | 0.141 |
| PVC | 0 | 0 | 0.324 | 0.282 |
| PVC | 0.00025 | 0 | 0.474 | 0.395 |

TABLE 2-continued

EFFECT OF PRIMER COATING ON THE COF

| Sub. Amorphous Substrate | Coating Thickness, Wet film (inches) | Wax, (wt %) | Static COF | Kinetic COF |
|---|---|---|---|---|
| PVC | 0.00025 | 1.0 | 0.101 | 0.164 |
| PVC | 0.00025 | 2.0 | 0.118 | 0.130 |

EXAMPLE 5

Primer coating composition A was applied onto the PETG copolyester film of Example 1 with a coating bar to give a wet coating thickness of 0.00025" (6 microns). The alcohol content of the coating was 10 percent (by weight) to allow the coating to wet out the film. The coated film was then dried for 10 seconds in a forced air oven at 100C. The coated PETG was printed with ultraviolet curable offset ink on the coated side. The printed film ink surface was laminated to a PVC film having a pressure sensitive adhesive on one surface. The pressure sensitive adhesive was adjacent the printed surface. Pressure was applied to create the bond. The laminate was pulled apart and the printed film evaluated for percent ink retained on the coated PETG. There was 100 percent retention of the ink to the coated PETG.

The primer coating of the present invention is clear and non-tacky to touch, provides reduced coefficient of friction to provide excellent slip characteristics when primer coated polymeric film substrates are stacked or passed over each other, and provides improved adhesion of printing inks to the substrate. The primer coating is effective on numerous amorphous polymeric substrates, is readily processible and may also be utilized in laminate structures.

This invention has been described in detail with particular reference to preferred embodiments and process thereof, but it will be understood that variations and modifications can be effected within the spirit and scope of the invention.

We claim:

1. A method for improving slip characteristics of a polymeric film when contacted with other polymeric films and improving ink adhesion to the surface of the polymeric film comprising the steps of:

a) applying to a surface of a substantially amorphous polymeric film a sufficient amount of a primer coating to improve adhesion of inks to the surface of the film and reduce a coefficient of friction as compared to a film without the primer coating thereon, wherein the primer coating comprises (i) 95 to 100 weight percent copolyester having repeat units from a dicarboxylic acid component comprising 8 to 25 mole percent 5-sulfoisophthalic acid and 75 to 92 mole percent isophthalic acid and repeat units from a diol component comprising 25 to 100 mole percent diethylene glycol, 0 to 75 mole percent 1,4-cyclohexane-dimethanol, and 0 to 30 mole percent ethylene glycol, based on 100 mole percent dicarboxylic acid component and 100 mole percent diol component, and (ii) 0 to 5 weight percent wax, and the film comprises a copolyester having repeat units from a dicarboxylic acid component comprising at least 75 mole percent terephthalic acid or naphthalene dicarboxylic acid and repeat units from a diol component comprising 0.5 to 65 mole percent 1,4-cyclohexanedimethanol and 35 to 99.5 mole percent ethylene glycol, based on 100 mole percent dicarboxylic acid component and 100 mole percent diol component;

b) drying the primer coating; and c) printing ink on the primer coated surface of the film.

2. The method of claim 1 wherein the primer coating is applied as a dispersion having a solids content of 15 to 40 weight percent

3. The method of claim 1 wherein the dispersion is prepared in water, a $C_1$–$C_4$ alcohol or mixtures thereof.

4. The method of claim 1 wherein the primer coating is applied to a thickness of 0.1 to 0.2 mils.

5. The method of claim 1 wherein the step of drying the primer coating is at temperatures of 250 to 300° F.

6. The method of claim 1 wherein said primer coating comprises 9 to 15 mole percent of 5-sulfoisophthalic acid, 85 to 91 mole percent isophthalic acid, and 31 to 80 mole percent diethylene glycol.

7. The method of claim 1 wherein the coefficient of friction is reduced by at least 10 percent for the film having a primer coating thereon as compared to the same film without the primer coating.

8. A method for improving slip characteristics of a polymeric film when contacted with other polymeric films and improving ink adhesion to the surface of the polymeric film comprising the steps of:

a) applying to a surface of a substantially amorphous polymeric film a sufficient amount of a primer coating to improve adhesion of inks to the surface of the film and reduce a coefficient of friction as compared to a film without the primer coating thereon, wherein the primer coating comprises (i) 95 to 100 weight percent copolyester having repeat units from a dicarboxylic acid component comprising 8 to 25 mole percent 5-sulfoisophthalic acid and 75 to 92 mole percent isophthalic acid and repeat units from a diol component comprising 25 to 100 mole percent diethylene glycol, 0 to 75 mole percent 1,4-cyclohexane-dimethanol, and 0 to 30 mole percent ethylene glycol, based on 100 mole percent dicarboxylic acid component and 100 mole percent diol component, and (ii) 0.25 to 5.00 weight percent wax, and the film is selected from the group consisting of poly(ethylene terephthalate); poly (ethylene naphthalene dicarboxylate); polycarbonate and polyvinyl chloride;

b) drying the primer coating; and c) printing an ink on the primer coated surface of the film.

9. A method for printing on a polymeric film, including the steps of applying an aqueous dispersion of a primer coating onto a polymeric substrate, drying the primer coating, and applying an ink to the coated polymeric substrate, wherein the improvement comprises utilizing the primer coating to improve ink adhesion such that said film exhibits 100 percent ink adhesion retention to the coated polymeric substrate, the polymeric substrate being a substantially amorphous polymer formed by melt extrusion, the primer coating having repeat units from a dicarboxylic acid component comprising 8 to 25 mole percent 5-sulfoisophthalic acid and 75 to 92 mole percent isophthalic acid and repeat units from a diol component comprising 25 to 100 mole percent diethylene glycol, 0 to 75 mole percent 1,4-cyclohexanedimethanol, and 0 to 30 mole percent ethylene glycol, based on 100 mole percent dicarboxylic acid component and 100 mole percent diol component.

10. The method of claim 9 wherein the primer coating comprises 9 to 15 mole percent of 5-sodioisophthalic acid, 85 to 91 mole percent isophthalic acid, and 31 to 80 mole percent diethylene glycol.

11. The method of claim 9 wherein the primer coating is further utilized to reduce the coefficient of friction of the polymeric film and further comprises up to 5 weight percent wax based on the total weight of the primer coating, and the polymeric substrate comprises a copolyester having repeat units from a dicarboxylic acid component comprising at least 75 mole percent terephthalic acid or naphthalene dicarboxylic acid and repeat units from a diol component comprising 0.5 to 65 mole percent 1,4-cyclohexanedimethanol and 35 to 99.5 mole percent ethylene glycol, based on 100 mole percent dicarboxylic acid component and 100 mole percent diol component;

12. The method of claim 9 wherein the primer coating is further utilized to reduce the coefficient of friction of the polymeric film and further comprises 0.25 to 5.00 weight percent wax based on the total weight of the primer coating and the polymeric substrate is selected from the group consisting of poly(ethylene terephthalate); poly(ethylene naphthalene dicarboxylate); polycarbonate and polyvinyl chloride.

* * * * *